United States Patent
Park et al.

(10) Patent No.: US 8,719,815 B1
(45) Date of Patent: May 6, 2014

(54) SYSTEMS AND METHODS FOR DISTRIBUTING A COMPUTER SOFTWARE PACKAGE USING A PRE-REQUISITE QUERY

(75) Inventors: Richard Park, Pleasant Grove, UT (US); Mark Bird, Highland, UT (US); David A. Eatough, Herriman, UT (US)

(73) Assignee: Crimson Corporation, Dover, DE (US)

( * ) Notice: Subject to any disclaimer, the term of this patent is extended or adjusted under 35 U.S.C. 154(b) by 1148 days.

(21) Appl. No.: 11/298,809

(22) Filed: Dec. 9, 2005

(51) Int. Cl.
  *G06F 9/445* (2006.01)

(52) U.S. Cl.
  USPC ........... 717/177; 717/174; 717/175; 717/176; 717/178

(58) Field of Classification Search
  None
  See application file for complete search history.

(56) References Cited

U.S. PATENT DOCUMENTS

| | | | |
|---|---|---|---|
| 5,721,824 A | 2/1998 | Taylor | |
| 6,381,742 B2 | 4/2002 | Forbes et al. | |
| 7,657,887 B2 * | 2/2010 | Kothandaraman et al. | ... 717/176 |
| 2002/0078186 A1 | 6/2002 | Engel et al. | |
| 2002/0144248 A1 | 10/2002 | Forbes et al. | |
| 2003/0005427 A1 * | 1/2003 | Herrero | .......... 717/178 |
| 2003/0163807 A1 * | 8/2003 | Drake et al. | .................. 717/174 |
| 2005/0240921 A1 | 10/2005 | Barker et al. | |

* cited by examiner

*Primary Examiner* — Lewis A Bullock, Jr.
*Assistant Examiner* — Mark Gooray
(74) *Attorney, Agent, or Firm* — Austin Rapp & Hardman

(57) ABSTRACT

A method for distributing a computer software package using a pre-requisite query is disclosed. A first pre-requisite query is associated with a package. Attribute information is obtained from one or more managed nodes across a computer network. The attribute information is stored on an administrative system. The first pre-requisite query is run using the attribute information on the administrative system to obtain a first result. The first result indicates whether the one or more managed nodes has the necessary attribute information for the package. The package is sent to the one or more managed nodes that have the necessary attribute information for the package.

17 Claims, 8 Drawing Sheets

SYSTEMS AND METHODS FOR DISTRIBUTING A COMPUTER SOFTWARE PACKAGE USING A PRE-REQUISITE QUERY

TECHNICAL FIELD

The present invention relates generally to computers and computer-related technology. More specifically, the present invention relates to distributing a computer software package with an associated pre-requisite query.

BACKGROUND

Computer and communication technologies continue to advance at a rapid pace. Indeed, computer and communication technologies are involved in many aspects of a person's day. Computers commonly used include everything from hand-held computing devices to large multi-processor computer systems.

There are many different kinds of computers in use today. The term "computer system" will be used herein to refer generally to any device or combination of devices that is capable of processing information to produce a desired result. Some examples of computer systems include personal computers, hand-held computers, personal digital assistants (PDAs), servers, mainframes, supercomputers, minicomputers, workstations, microcomputers, microcontrollers, and the like.

Computers are used in almost all aspects of business, industry and academic endeavors. More and more homes are using computers as well. The pervasiveness of computers has been accelerated by the increased use of computer networks, including the Internet. Most companies have one or more computer networks and also make extensive use of the Internet. The productivity of employees often requires human and computer interaction. Improvements in computers and software have been a force for bringing about great increases in business and industrial productivity.

Maintaining and supporting computer systems is important to anyone who relies on computers. Whether a computer or computing device is in a home or at a business, at least some maintenance and/or support is often needed. For example, sometimes there are problems with computer hardware. In addition, computer hardware is often upgraded and replaced with new components. Similarly, computer software is also frequently upgraded or replaced. New computer hardware and software is continually being integrated into systems across the world.

Installing new computer hardware and/or software, or fixing problems with existing systems, may cause down-time during which the business or individual operates at a diminished level. Most individuals and businesses try to minimize computer problems so as to avoid down-time.

When a business or individual is trying to decide whether to make a change to a computer system, the concern about down-time may outweigh the cost of the installation or change in influencing the decision. The professional computer service industry which carries out and supports installations and upgrades has been rapidly expanding. However, even with such computer professional support, the threat of such down-time coupled with the costs of such professional services is a concern.

As corporate performance and end-user productivity have become increasingly dependent on computers, computer support personnel are continuously under pressure to accomplish more with existing or reduced staff head counts. They are also under pressure to perform tasks as efficiently as possible which may include minimizing effects to existing computer systems and networks.

As shown from the above discussion, there is a need for systems and methods that will improve the ability to manage and support computer systems. Improved systems and methods may enable a person performing computer support to work more efficiently and accomplish more in less time. Benefits may be realized by providing increased functionality to assist in computer maintenance and support.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
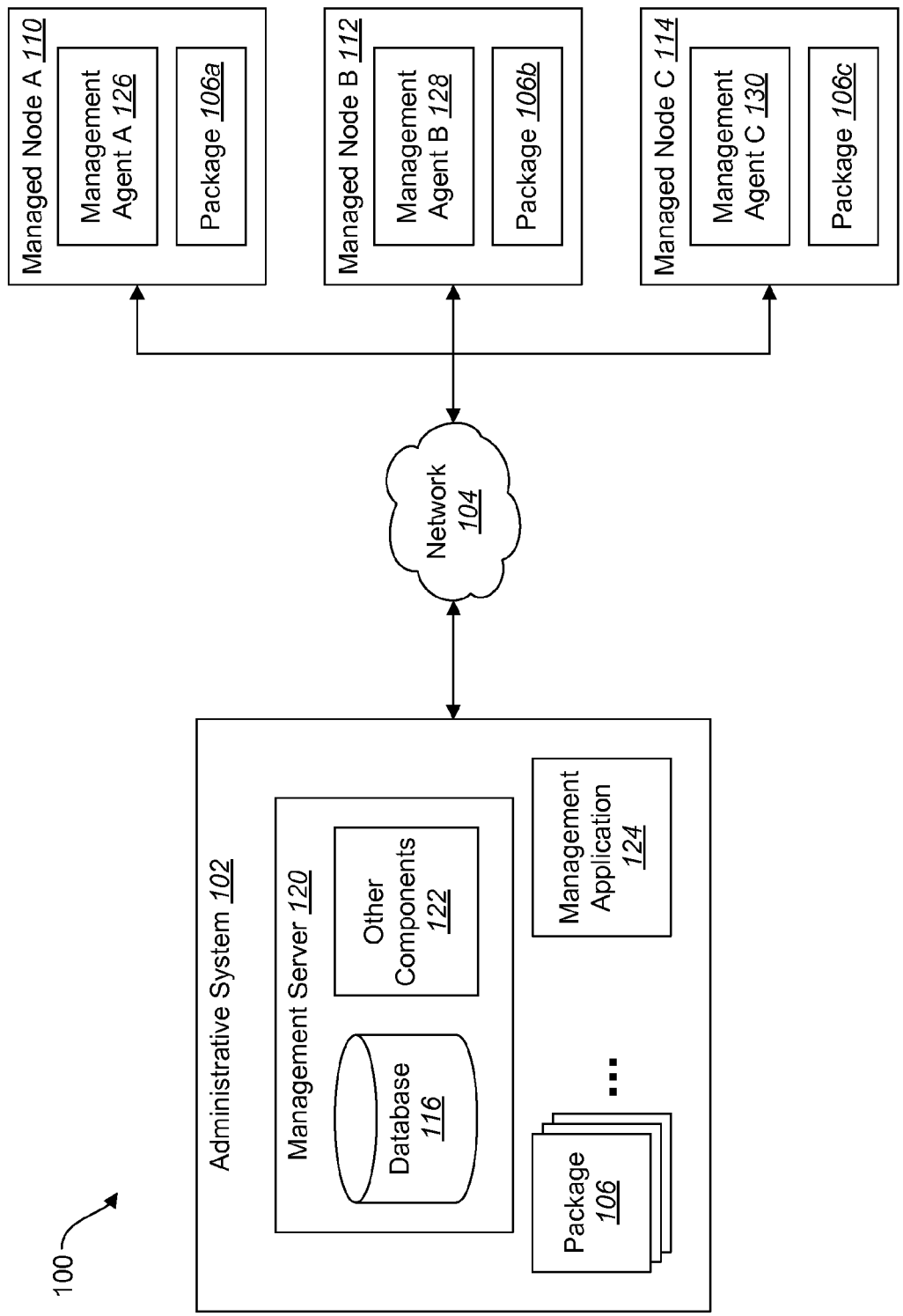
FIG. 1 is a block diagram illustrating one embodiment of a software distribution system.

A method for distributing a computer software package using a pre-requisite query is disclosed. A first pre-requisite query is associated with a package. Attribute information is obtained from one or more managed nodes across a computer network. The attribute information is stored on an administrative system. The first pre-requisite query is run using the attribute information on the administrative system to obtain a first result. The first result indicates whether the one or more managed nodes has the necessary attribute information for the package. The package is sent to the one or more managed nodes that have the necessary attribute information for the package.

In some embodiments there may be a second pre-requisite query associated with a dependent package. The second pre-requisite query associated with the dependent package is run to obtain a second result. The second result indicates whether the one or more managed nodes has the necessary attribute information for the dependent package. The dependent package may be sent to the one or more managed nodes that have the necessary attribute information for the dependent package.

In some cases a request for the package may be received from a managed node. In other cases the managed mode may not have requested the package. Furthermore, the package may be scheduled to be deployed to one or more managed nodes at a certain date and/or time.

The pre-requisite query may include an operating system requirement and a software requirement. The pre-requisite query may further include a disk space requirement and a RAM requirement.

Pre-requisite queries and attribute information may be stored in a database on an administrative system. In some embodiments there may be a plurality of pre-requisite queries that are associated with a plurality of packages. In those situations the database is configured to store the plurality of pre-requisite queries and the attribute information.

The administrative system may include a management application. The management application is configured to communicate with management agents running on managed nodes in order to obtain the attribute information.

A computer system that is configured to implement a method for distributing a computer software package using a pre-requisite query is also disclosed. The computer system includes a processor and memory in electronic communication with the processor. Instructions are stored in the memory to implement a method for distributing a computer software package using a pre-requisite query. A first pre-requisite query is associated with a package. Attribute information is obtained from one or more managed nodes across a computer network. The attribute information is stored on the computer system. The first pre-requisite query is run using the attribute information on the computer system to obtain a first result. The first result indicates whether the one or more managed nodes has the necessary attribute information for the package. The package is sent to the one or more managed nodes that have the necessary attribute information for the package.

A computer-readable medium comprising executable instructions for implementing a method for distributing a computer software package using a pre-requisite query is also disclosed. A first pre-requisite query is associated with a package. Attribute information is obtained from one or more managed nodes across a computer network. The attribute information is stored on an administrative system. The first pre-requisite query is run using the attribute information on the administrative system to obtain a first result. The first result indicates whether the one or more managed nodes has the necessary attribute information for the package. The package is sent to the one or more managed nodes that have the necessary attribute information for the package.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device. Software that implements the functionality associated with components described herein may comprise a single instruction, or many instructions, and may be distributed over several different code segments, among different programs, and across several memory devices.

Advancements with computer software have dramatically increased over the recent years. Powerful software applications are being installed and downloaded to enable computers to perform complex tasks with increased speed and efficiency. Many computer networks within businesses install identical software applications on the numerous computer systems in the network. An administrator or administrative system may send a new software application to each computer on its network. The administrator or administrative system may also send updates for the software applications that are installed on the computer systems.

The present systems and methods make it possible for a user to create a package definition that can be used by other users. The user creating this definition may be referred to as a package creator. The present systems and methods use pre-requisite queries to help provide a more reliable solution for package deployment.

As noted above the package creator creates a package definition, part of this definition is a pre-requisite query. This pre-requisite query defines the inventory attributes that a machine needs in order to have the package installed on the system.

When a less expert user, such as a help desk operator, deploys the package the pre-requisite query is evaluated and any managed nodes that are not part of the query result set will fail the task. Managed nodes that are part of the query result set will have the software package installed on them. This allows the help desk operator to leverage the expertise of the package creator.

As organizations grow, there are more and more computer users. With a larger number of users, they cannot all become experts in the packages being deployed and inadvertent errors will likely result because the package is deployed to a system or systems that do not support the package.

The present systems and methods make it possible for a small number of users within the organization to specialize in package creation and define pre-requisites for the package using inventory queries. This prevents the potentially harmful deployment of unstable package installations within the organization, or deployment of packages to systems that are incompatible with the package, resulting in a cost saving for the enterprise level organization. In these systems and methods, the query is directly associated with the package so that anyone can deploy the package without having to have in depth knowledge of the package's installation requirements. In certain embodiments, the pre-requisites are determined based on the full inventory information stored in a database on an administrative system, wherein the pre-requisite check is performed on the administrative system rather than on the managed node thereby avoiding the costly download of the entire package.

Certain embodiments show a pre-requisite query that identifies inventory attributes that a machine needs. Other embodiments may specify a pre-requisite query that identifies inventory attributes that a machine should not have in order to qualify or pass the pre-requisite query. Another embodiment might use an LDAP query for the pre-requisite query, or a group of devices.

One challenge of deploying software is that the individual who builds the package may not be the same person who deploys the software in the organization. This is particularly true in organizations with hundreds of users. Because many packages have a need to be installed on a particular OS or require certain versions of a DLL it requires an in depth knowledge of the individual packages to avoid problematic deployments. Large organizations often need to rely on users, such as help desk operators, to deploy software and their unfamiliarity with the detailed requirements of the package often result in incorrect deployments.

These systems and methods address this issue by allowing for a pre-requisite query to be associated with the package, which makes it possible for the expert package creator to embed their knowledge of system requirements into the package definition.

FIG. 1 illustrates an exemplary system 100 in which some embodiments may be practiced. An administrative computer system 102 is connected to a computer network 104, such as a corporate local area network (LAN). The administrative system 102 is used to manage other computer systems that are also connected to the computer network 104. These other computer systems will be referred to herein as "managed nodes." For simplicity, only three managed nodes are shown in the system of FIG. 1, namely managed node A 110, managed node B 112 and managed node C 114. Of course, the systems in which embodiments disclosed herein are practiced may include many additional managed nodes.

The administrative system 102 includes a management server 120. The management server 120 may include a database 116 of information. The database 116 may include inventory information from the managed nodes. As a result, a pre-requisite check may be performed on the administrative system 102 using the database 116 rather than on the managed nodes thereby avoiding the costly download of the entire package.

The management server 120 may also include various other components 122 that are configured to perform tasks such as scheduling, handling alerts, and so forth. An example of a management server 120 that may be used with embodiments disclosed herein is the core server for the LANDesk® Management Suite.

The administrative system 102 also includes a management application 124. The management application 124 may be used to perform various tasks related to the management of the computer network 104, such as remote control, software distribution, software license monitoring, operating system imaging and migration, IT asset management, problem resolution, and so forth. As part of performing these tasks, the management application 124 may connect to the management server 120 and query the management server 120 for information. An example of a management application 124 that may be used is the console application for the LANDesk® Management Suite.

To enable a user of the administrative system 102 to perform management tasks via the management application 124, the managed nodes in the system 100 each include a management agent. In particular, managed node A 110 includes management agent A 126, managed node B 112 includes management agent B 128, and managed node C 114 includes management agent C 130. The management agents in the system 100 perform management-related tasks in response to requests from the management application 124.

The management application 124 may obtain inventory information from the managed nodes by communicating with the management agents on the managed nodes. The management agents may obtain the information for the systems they reside on and send this information back to the management application 124. The management application 124 may then add this information to the database 116 through the management server 120. As a result, a pre-requisite check may be performed on the administrative system 102 using the database 116 rather than on the managed nodes because the needed information about the managed nodes was already obtained and made available on the administrative system 102.

The present systems and methods provide a software package distribution system 100. The system 100 enables the administrative system 102 to send a package 106 to individual managed nodes 110, 112, and 114. The package 106 may include a software application, a software update, etc. that may be downloaded by the managed nodes 110, 112, and 114. The managed nodes 110, 112, and 114 include any kind of computing device that may need to be managed by the administrative system. While a limited number of managed nodes are illustrated in FIG. 1, the distribution system 100 may distribute the package 106 to any number of managed nodes that are in electronic communication with the network 104.

The administrative system 102 may communicate the package 106 to the managed nodes 110, 112, and 114 over a network 104. Alternatively, the managed nodes 110, 112, and 114 may communicate a request to the administrative system 102 to deploy the package 106 over the network 104. The network 104 depicted in FIG. 1 may be embodied in a wide variety of configurations and may include, for example, a combination of multiple networks. The network 104 may include, for example, a local area network (LAN), storage area networks (SANs), metropolitan area networks (MANs), wide area networks (WANs), and combinations thereof (e.g., the Internet). A variety of different network configurations and protocols may be used, including Ethernet, TCP/IP, UDP/IP, IEEE 802.11, IEEE 802.16, Bluetooth, asynchronous transfer mode (ATM), fiber distributed data interface (FDDI), token ring, and so forth, including combinations thereof. Of course, some embodiments may also be practiced with conventional point-to-point connections, such as enterprise systems connection (ESCON), small computer system interface (SCSI), fibre channel, etc., that may not typically be viewed as a "network."

The database 116 shown in FIG. 1 may also include information associated with the package 106 such as configuration requirements that managed nodes are required to possess in order to process the package 106. The database 116 also includes information relating to the managed nodes 110, 112, and 114 such as the configuration attributes of each client. Before deploying the package 106, the administrative system 102 may access the information stored in the database 116 in order to determine which managed nodes possess the configuration attributes required to process the package 106. If a managed node does not possess the required configuration attributes, the package 106 is not sent to that managed node. When the administrative system 102 communicates with a new managed node, the attributes of the new managed node are communicated to the administrative system 102 and stored in the database 116.

Figure 2:
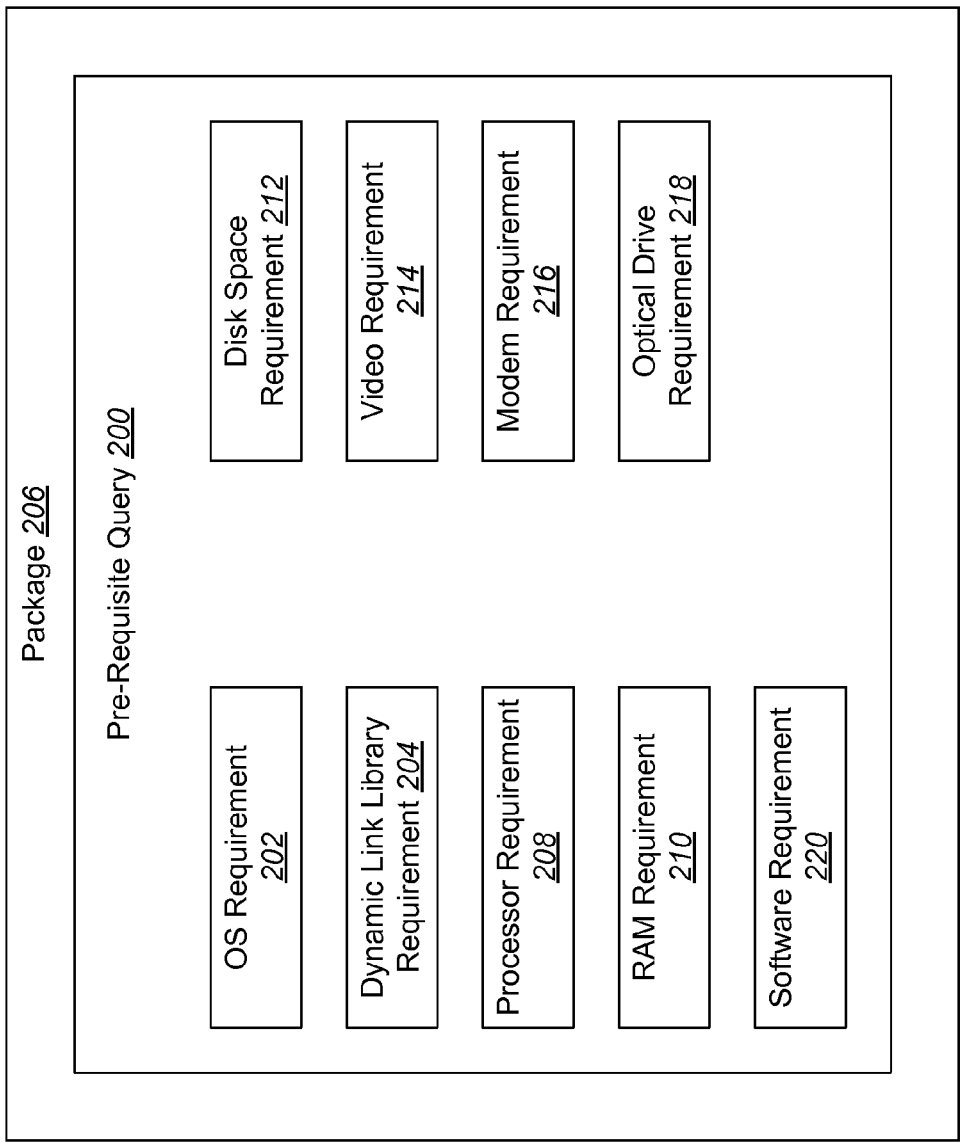
FIG. 2 is a block diagram illustrating one embodiment of a software package.

FIG. 2 illustrates a block diagram depicting a package 206 that may be deployed in the system 100. The package 206 includes the software or data that is to be installed or updated. The package 206 also includes a pre-requisite query 200. The query 200 is associated with the package 206 when the package 206 is first created. Associating the query 200 with the package 206 enables the query 200 to be unique to the package 206. In one embodiment the query 200 contains information regarding the configuration attributes the managed nodes 110, 112, and 114 should possess in order to process the package 206. In a further embodiment, the query 200 may contain information regarding the configuration attributes the managed nodes 110, 112, and 114 should not have in order to process the package 206. The configuration attributes may include, but are not limited to, an operating system (OS) requirement 202, a dynamic link library (DLL) requirement 204, a processor requirement 208, a RAM requirement 210, a disk space requirement 212, a video requirement 214, a modem requirement 216, an optical drive requirement 218, and a software requirement 220. The pre-requisite query 200 may be composed of several smaller sub-queries joined together using logical combinations via an AND or OR operation.

The OS requirement 202 provides information regarding the operating system the managed nodes 110, 112, and 114 need in order to process the package 206. For example, the OS requirement 202 may specify Windows 2000®, Windows NT®, Windows XP®, Linux®, Unix®, etc. The OS requirement 202 may also specify any service packs that may be needed for the particular operating system.

The DLL requirement 204 indicates DLL's (Dynamically Linked Libraries) the managed nodes 110, 112, and 114 need in order to process the package 206. For example, the package 206 may be required to access a certain executable function. If the managed node 110, 112, or 114 does not contain the required DLL specified by the DLL requirement 204, the package 206 will not be sent to be installed.

The processor requirement 208 includes information relating to the required processor the managed nodes 110, 112, and 114 need in order to process the package 206. In a further embodiment, the processor requirement 208 may include information regarding the required clock speed the managed node or client 110, 112, and 114 needs in order to install the package 206.

The RAM requirement 210 indicates the amount of RAM the managed node or client 110, 112, or 114 needs to install the package 206. The disk space requirement 212 specifies the disk space or free disk space the managed node 110, 112, or 114 needs in order to process the package 206.

The video requirement 214 may specify the attributes the video card of the managed node 110, 112, or 114 needs in order to process the package 206. For example, the video requirement 214 may require the node to be capable of displaying a certain resolution or a certain number of colors. The modem requirement 216 provides the modem configuration the managed node 110, 112, or 114 needs in order to install the package 206. The optical drive requirement 218 specifies the configurations of optical drives the client 110, 112, or 114 needs in order to install the package 206. Optical drives may include CD-ROM, CD-RW, DVD-ROM, DVD±RW, Blu-ray drives, and the like. The software requirement 220 indicates what other pieces of software should be installed on the system before the package 206 can or should be installed.

Other configuration attributes the managed nodes 110, 112, and 114 would need in order to install the package 206 may exist. Additional requirements may be associated with the package 206 when the package 206 is first created. The package 206 is only sent to the managed nodes that have the required configuration attributes, or a certain threshold amount of the configuration attributes, specified by the pre-requisite query 200.

Figure 3:
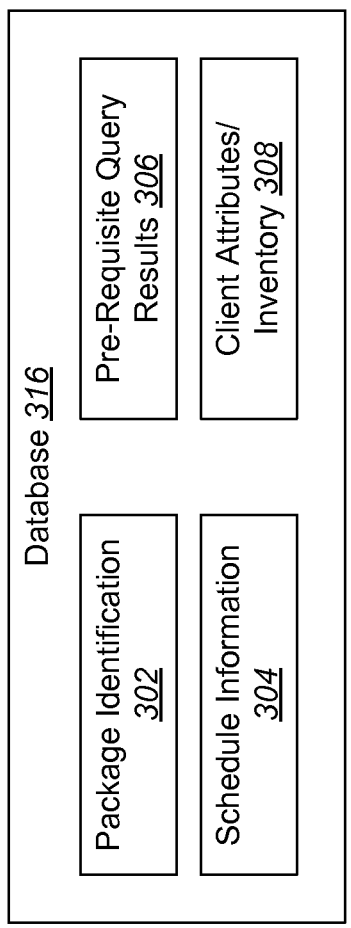
FIG. 3 is a block diagram illustrating one embodiment of a database.

FIG. 3 illustrates a block diagram depicting one embodiment of a database 316. The database 316 stores information regarding the packages 206 and the managed nodes 110, 112, and 114 of the distribution system 100 as explained in relation to FIG. 1. In one embodiment, the database 316 stores package identification information 302. The package identification 302 or the package definition may include the name of the package, the location of the package, the functions of the package, the size of the package, etc. For example, the package identification 302 may include "Microsoft Word", word processing, and 100 MB to indicate the name, function, and size of the package 206 respectively. A pathname may also be included that points to the package itself.

The database 316 may also store schedule information 304 relating to the packages 206. The schedule information 304 provides information regarding when the packages 206 are scheduled to be deployed to the managed nodes 110, 112, and 114. For example, the schedule information 304 may comprise the date and time various packages 206 will be sent to the managed nodes 110, 112, and 114 within the distribution system 100.

Further, the database 316 may also store pre-requisite query results 306. The results 306 comprise information relating to the pre-requisite query 200 as described in FIG. 2. Thus, the pre-requisite queries for a number of packages may have already been processed by the managed nodes and the results of those pre-requisite queries may be stored in the pre-requisite query results 306. The database 316 may also include client attributes or inventory 308. The client attributes 308 include information regarding each managed node or client 110, 112, and 114 within the distribution system 100. For example, the client attributes 308 may include the operating system that is operating within the client 110. The client attributes 308 may also include information about additional configurations such as the processor, RAM, available disk space, etc. of the client 110. The client attributes/inventory 308 may be used to run a pre-requisite query on the managed nodes on the administrative system 102. Various pieces of information may be gathered from the managed nodes and placed in the database 316 as the implementation dictates.

Figure 4:
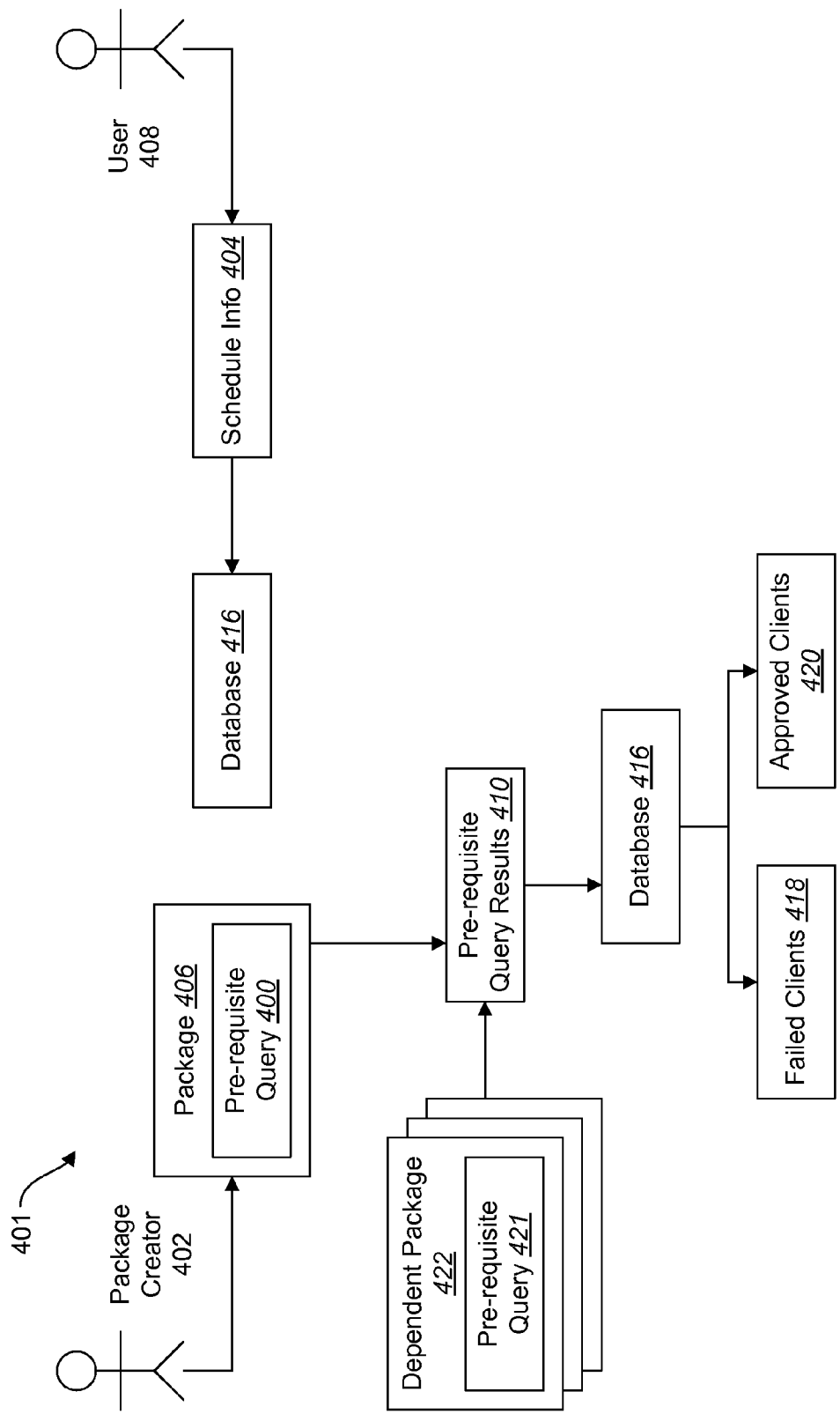
FIG. 4 is a block diagram illustrating a further embodiment of the software distribution system.

FIG. 4 illustrates one embodiment of a package distribution system 401 as described in FIG. 1. The system 401 includes a package creator 402 who assembles and creates a package 406. The package 406 may be a software application, a software update, etc. The package creator 402 also creates the pre-requisite query 400 and associates the query 400 with the newly created package 406.

In one embodiment, the package creator 402 also creates a dependent package 422. The dependent package 422 may also be a software application, a software update, etc. that is required to be deployed together with the package 406. In a further embodiment, the package creator 402 creates a plurality of dependent packages 422. The creator 402 associates a pre-requisite query 421 with each dependent package 422. The query 400 associated with the package 406 as well as the pre-requisite query 421 associated with the dependent package 422 are evaluated and pre-requisite query results 410 are determined. By evaluating the query at the management server 120 there is not a need for the managed nodes 110, 112, 114 to have an agent capable of evaluating queries. When the managed nodes 110, 112, 114 have different operating systems this provides an advantage over needing to implement an agent for the various operating systems to evaluate pre-requisite queries on each managed node. The results 410 provide the configuration attributes identified by the query 400 that a client needs in order to process the package 406 and any related dependent packages 422. The results 410 are stored in a database 416 as described in FIG. 3.

A user 408 schedules the deployment of the package 406 to managed nodes within the system 401. The user 408 provides schedule information 404 which is stored in the database 416. When the schedule information 404 indicates that the package 406 is to be deployed, the results 410 of the pre-requisite query 400 are compared with the client attributes 308 stored within the database 416. The managed nodes 110, 112, or 114 with the client attributes 308 that match the pre-requisite query results 410 are determined to be approved managed nodes 420. The approved managed nodes 420 possess the configuration attributes necessary to install and process the package 406. The managed nodes 110, 112, or 114 with client attributes 308 that do not match the pre-requisite query results 410 are deemed to be failed managed nodes 418. The failed managed nodes 418 do not receive the package 406 for installation.

Figure 5:
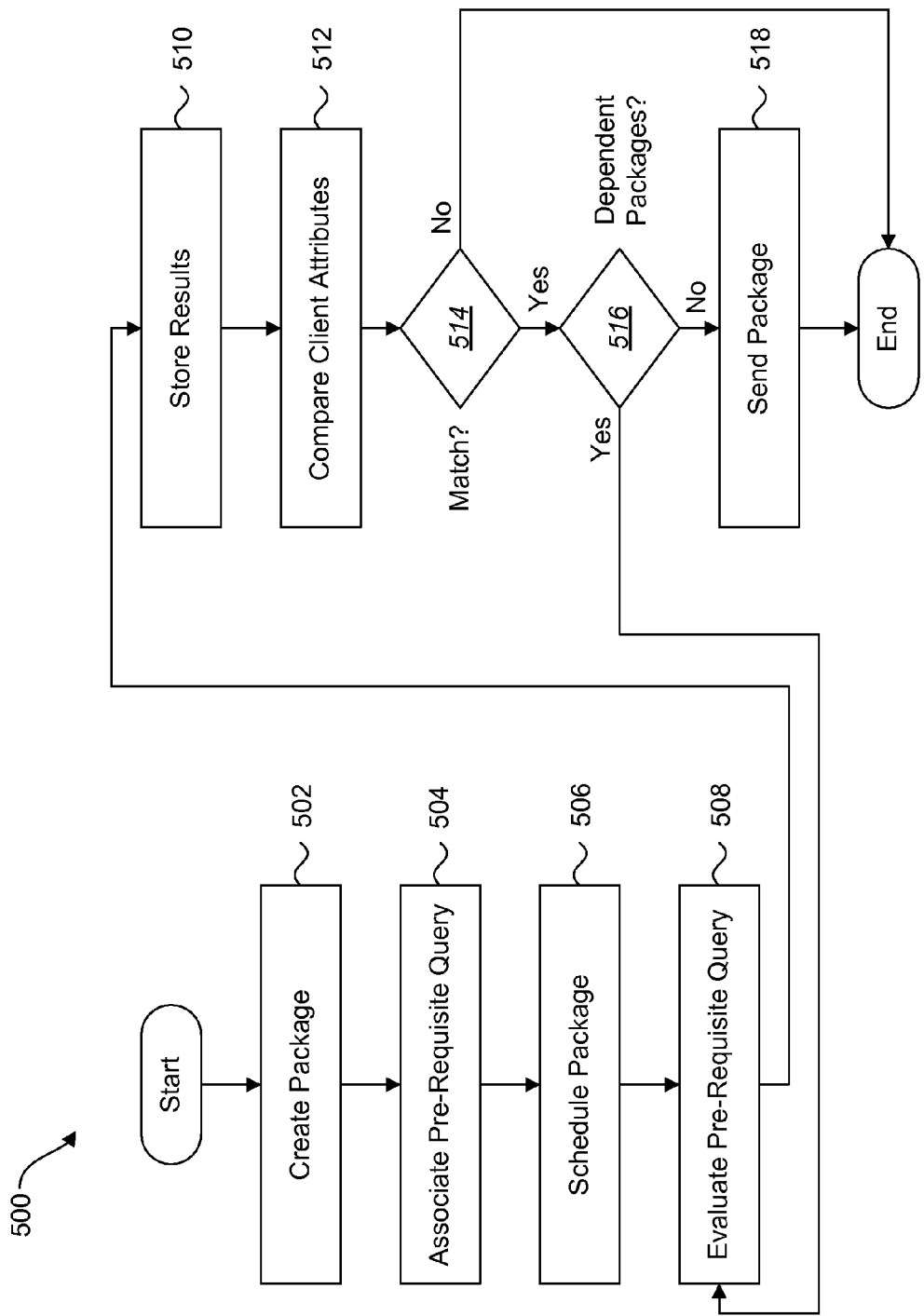
FIG. 5 is a flow chart illustrating one embodiment of a push deploy method.

FIG. 5 is a flow chart illustrating one embodiment of a push deploy method 500. The method 500 may be used in conjunction with the package distribution system 401 previously described in FIG. 4. The method 500 enables the administrative system 102 to send the package 406 to the approved managed nodes 420 at the time indicated by the schedule information 404. The method 500 begins by creating 502 a package 406. In one embodiment, the package 406 is created by the package creator 402. The package 406 may include a software application, a software update, etc.

Once the package 406 is created 502, the method 500 continues by associating 504 the pre-requisite query 200 with the package 406. Associating 504 the query 200 with the package 406 enables the query 200 to be unique to the package 406. A plurality of packages may be created and each individual package is associated with a unique pre-requisite query 200. It is also possible for some of the plurality of packages to share the same query, thus each individual package may have a unique query or may reuse a query associated with another package. As previously explained, the query 200 contains information regarding the configuration attributes the managed nodes 110, 112, and 114 need in order to process and install the package 406.

The method 500 continues and the package 406 is scheduled 506 to be deployed at a certain time. Before the package 406 is deployed, the pre-requisite query 200 associated with the package 406 is evaluated 508. In one embodiment, evaluating 508 the query 200 includes determining the pre-requisite query results 410. The results 410 provide information relating to the configuration attributes the managed nodes 110, 112, and 114 need in order to install the package 406. In one embodiment, the results 410 are stored 510 in the database 416.

After the results 410 of the query 200 are stored 510 in the database 416, the method 500 compares 512 the client attributes 308 stored in the database 416 with the stored results 410. As previously explained, the client attributes 308 provide information regarding the configuration attributes of each client within the distribution system 400. The method 500 determines 514 if a match between the client attributes 308 and the results 410 is achieved. If there is no match 514, the method 500 ends and the package 406 is not deployed to the managed nodes 110, 112, and 114.

However, if there is a match 514, the method 500 determines 516 if there is a dependent package 422 associated with the package 406. The dependent package 422 may include a software application, a software update, etc. that is required to be deployed with the package 406. A unique pre-requisite query 200 is also associated with the dependent package 422. If a dependent package 422 exists at the step 516, the method 500 evaluates 508 the pre-requisite query associated with the dependent package 422. The results 410 of the pre-requisite query associated with the dependent package 422 are stored within the database 416 and then compared 512 with the client attributes 308. If there is no match 514 between the client attributes 308 and the pre-requisite query associated with the dependent package 422, the method 500 ends and the dependent package 422 and the package 406 are not deployed.

If there is a match 514, the method 500 determines 516 if there are additional dependent packages 422. If there are additional dependent packages 422, the method 500 proceeds to evaluate 508 the pre-requisite query associated with each dependent package 422 as previously explained. In one embodiment, the client attributes 308 of a client or managed node need to match each pre-requisite query associated with each dependent package 422. For example, the package 406 may be associated with a plurality of dependent packages 422. The client attributes 308 of the client 110 may match the pre-requisite query results 410 of the package 406, but the client attributes 308 need to also match the pre-requisite query results of each dependent package 422 before the package 406 and associated dependent packages 422 are deployed to the client 110. If there are no additional dependent packages 422, the method 500 proceeds to send 518 the package 406 and any associated dependent packages 422 to the managed nodes 110, 112, and 114 that possess the configuration attributes required by the pre-requisite queries.

Figure 6:
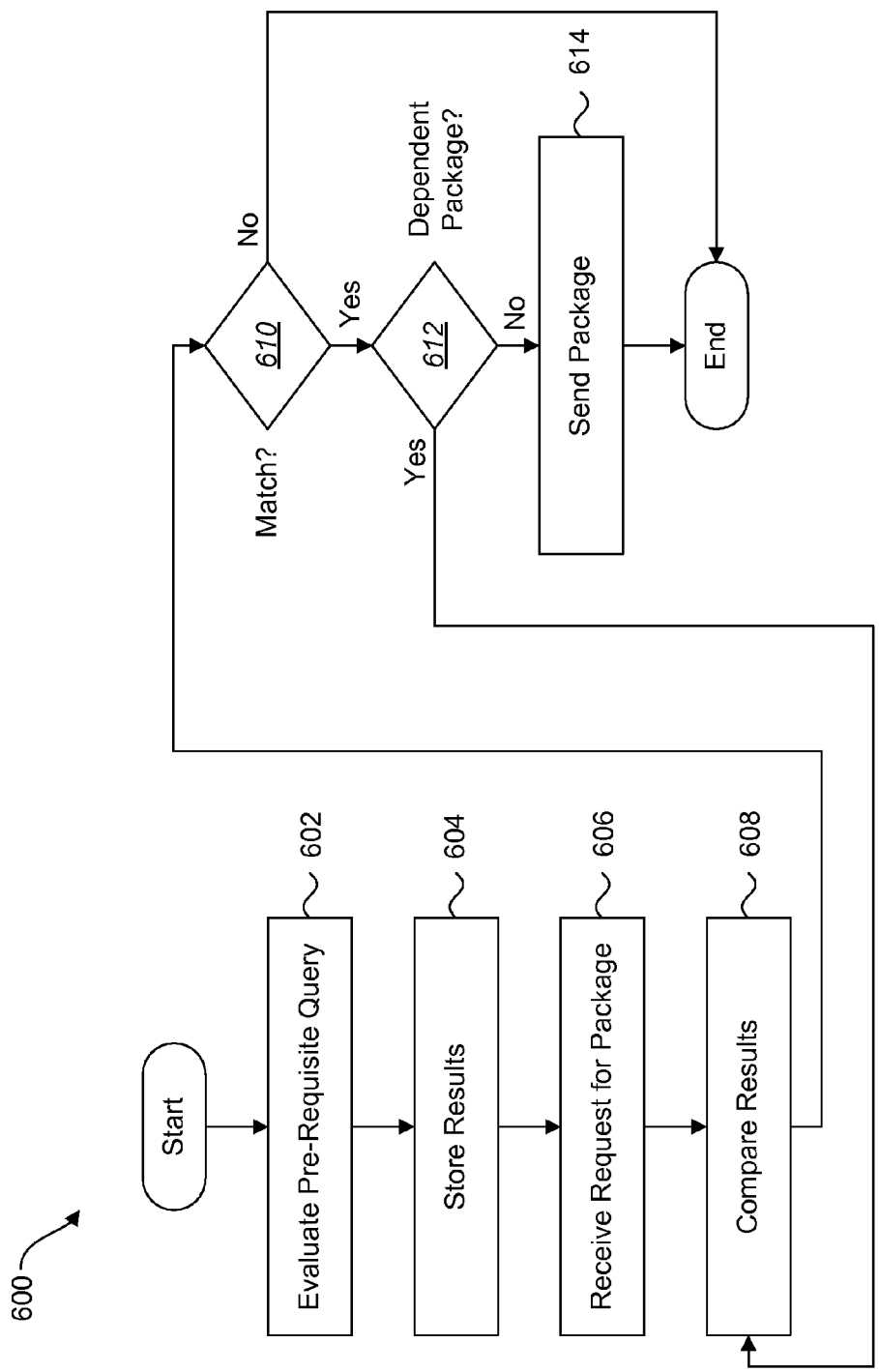
FIG. 6 is a flow chart illustrating one embodiment of a policy deployment method.

FIG. 6 is one embodiment of a policy deployment method 600. The method 600 enables the managed nodes 110, 112, and 114 to send a request for the package 406. The method 600 starts and the pre-requisite query 200 of the package 406 is evaluated 602. In one embodiment, the method 600 evaluates 602 the pre-requisite queries of multiple packages, such as dependent packages 422. The results 410 of each pre-requisite query are stored 604 in the database 416. The method 600 continues and a request for the package 406 is received 606 from one or more of the managed nodes. The stored results 410 of the pre-requisite query 200 associated with the requested package 406 are compared 608 with the client attributes 308 of the client or managed node that sent the request. If the client attributes 308 do not match 610 the stored results 410 of the package 406, the method 600 ends. The package 406 is not sent to the client that provided the request because the client does not possess the required configuration attributes in order to properly install and process the package 406.

If the stored results 410 match 610 the client attributes 308 of the client that sent the request, the method 600 continues and determines 612 if a dependent package 422 associated with the package 406 exists. If a dependent package 422 exists, the method 600 compares 608 the stored results 410 of the pre-requisite query associated with the dependent package 422. If the results 410 of the pre-requisite query associated with the dependent package 422 do not match 610, the method 600 ends and neither the package 406 nor any dependent packages 422 are sent to the client. But, if the client attributes 308 match the results 410, the method 600 determines 612 if there are additional dependent packages 422. If there are no additional dependent packages 422, the method 600 sends 614 the package 406 and any associated dependent packages 422 to the client that sent the request and the method 600 ends.

Figure 7:
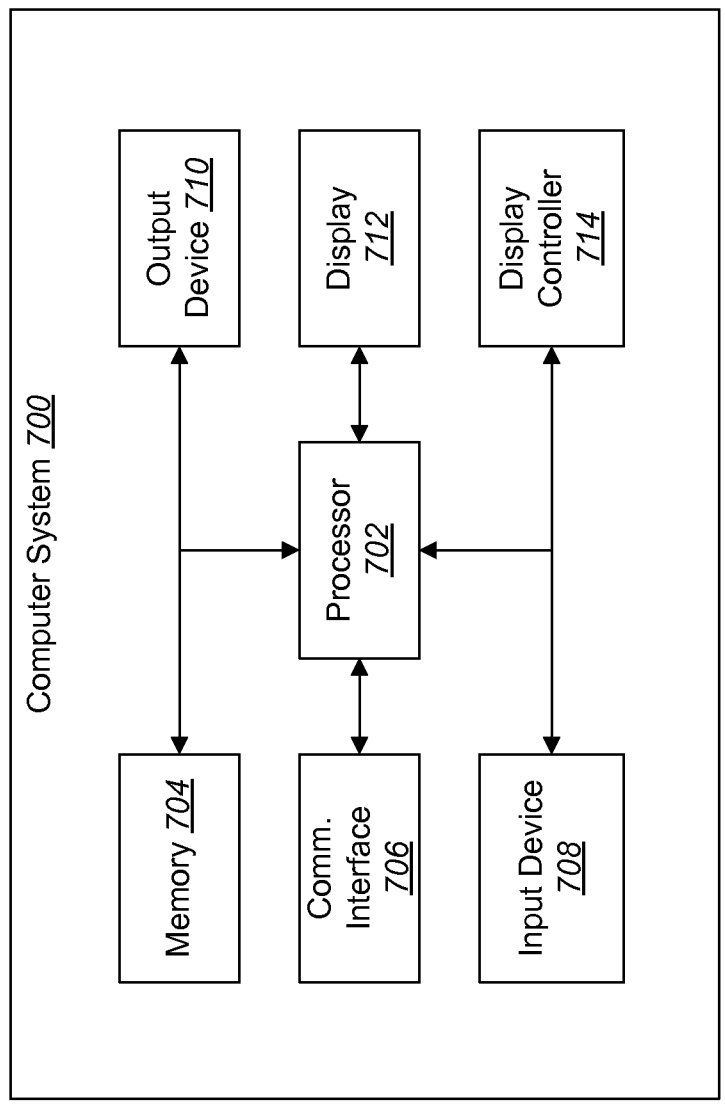
FIG. 7 is a block diagram illustrating the major hardware components typically utilized in a computer system.

FIG. 7 is a block diagram illustrating the major hardware components typically utilized in a computer system 700. The illustrated components may be located within the same physical structure or in separate housings or structures.

The computer system 700 includes a processor 702 and memory 704. The processor 702 controls the operation of the computer system 700 and may be embodied as a microprocessor, a microcontroller, a digital signal processor (DSP) or other device known in the art. The processor 702 typically performs logical and arithmetic operations based on program instructions stored within the memory 704.

As used herein, the term memory 704 is broadly defined as any electronic component capable of storing electronic information, and may be embodied as read only memory (ROM), random access memory (RAM), magnetic disk storage media, optical storage media, flash memory devices in RAM, on-board memory included with the processor 702, EPROM memory, EEPROM memory, registers, etc. The memory 704 typically stores program instructions and other types of data. The program instructions may be executed by the processor 702 to implement some or all of the methods disclosed herein.

The computer system 700 typically also includes one or more communication interfaces 706 for communicating with other electronic devices. The communication interfaces 706 may be based on wired communication technology, wireless communication technology, or both. Examples of different types of communication interfaces 706 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The computer system 700 typically also includes one or more input devices 708 and one or more output devices 710. Examples of different kinds of input devices 708 include a keyboard, mouse, microphone, remote control device, button, joystick, trackball, touchpad, lightpen, etc. Examples of different kinds of output devices 710 include a speaker, printer, etc. One specific type of output device which is typically included in a computer system is a display device 712. Display devices 712 used with embodiments disclosed herein may utilize any suitable image projection technology, such as a cathode ray tube (CRT), liquid crystal display (LCD), light-emitting diode (LED), gas plasma, electroluminescence, or the like. A display controller 714 may also be provided, for converting data stored in the memory 714 into text, graphics, and/or moving images (as appropriate) shown on the display device 712.

Of course, FIG. 7 illustrates only one possible configuration of a computer system 700. Various other architectures and components may be utilized.

Figure 8:
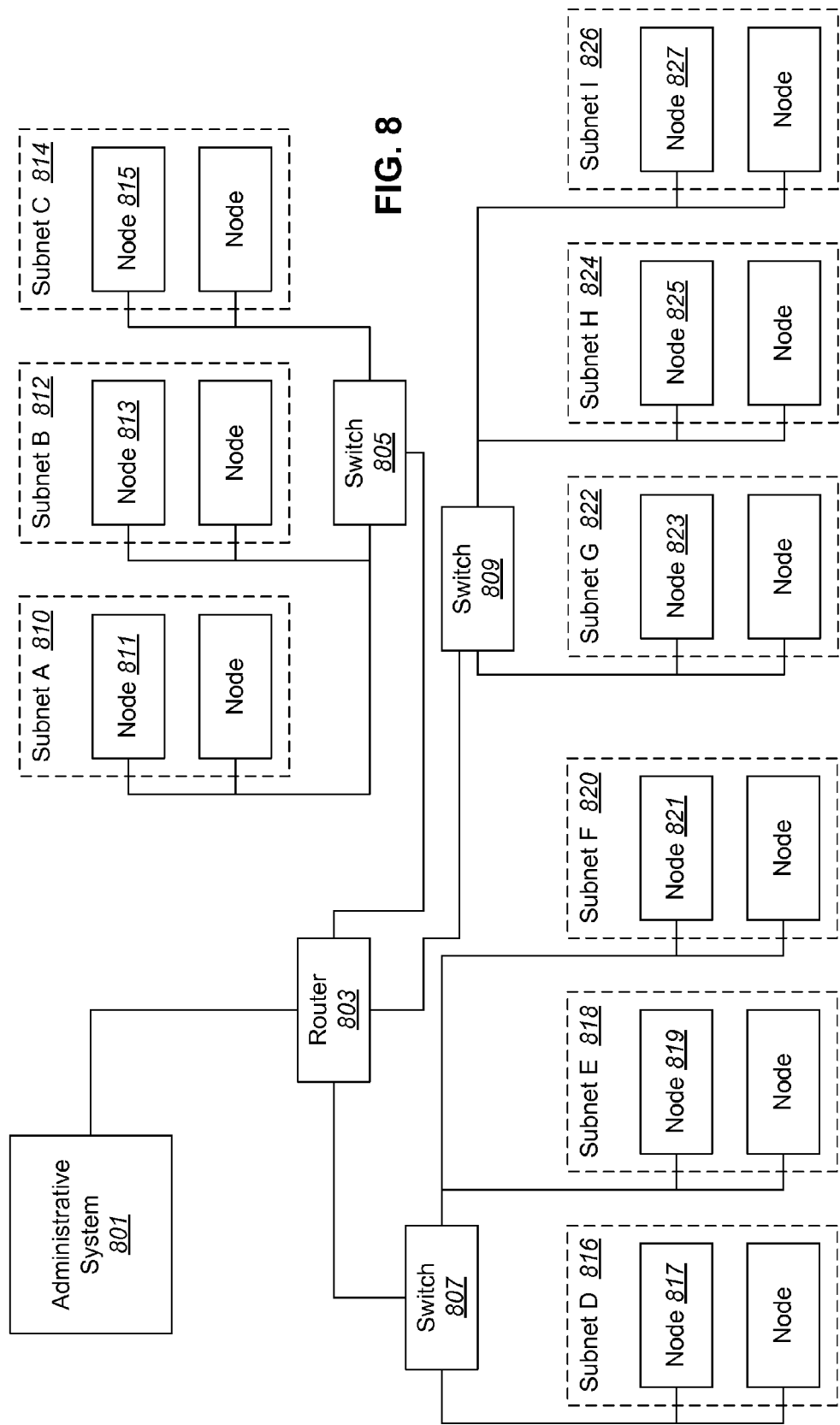
FIG. 8 is an exemplary block diagram illustrating a computer network on which the present systems and methods may be implemented.

FIG. 8 is an exemplary block diagram illustrating a computer network on which the present systems and methods may be implemented. In FIG. 8, an administrative system 801 connects to a router 803. The administrative system 801 may be any computer or computing device that has been configured to, or is being used for, receiving notifications from one or more monitors.

The router 803 may be connected to three switches: a first switch 805, a second switch 807 and a third switch 809. Each switch 805, 807, 809 connects to three subnets. The first switch 805 connects to three subnets 810, 812, and 814. The second switch 807 connects to three subnets 816, 818, and 820. The third switch 809 connects to three subnets 822, 824, and 826. The network nodes or elements 811, 813, 815, 817, 819, 821, 823, 825 and 827 represent computer systems or devices on the computer network. One or more of the nodes may use embodiments of the distribution systems and methods herein.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for distributing a computer software package using a pre-requisite query comprising:
associating a first pre-requisite query with a package, wherein the first pre-requisite query defines necessary configuration attributes that a node must possess to install the package;
associating a second pre-requisite query with each of one or more dependent packages, wherein a dependent package is required to be deployed with the package;
wherein said pre-requisite query contains attributes that a machine needs in order to have the package and dependent packages installed on the system;
obtaining, by a management application, attribute information from one or more managed nodes across a computer network by communicating with a management agent on each of the one or more managed nodes;
storing the attribute information on an administrative system, wherein the administrative system includes the management application;
scheduling the package to be deployed at a scheduled time;
storing schedule information on the administrative system;
evaluating at the scheduled time the first pre-requisite query associated with the package and the second pre-requisite queries associated with each of the one or more dependent packages with the stored attribute information of the one or more managed nodes;
storing, on the administrative system, all pre-requisite query results for the one or more managed nodes for the first pre-requisite query and each second pre-requisite query associated with the one or more dependent packages;
determining, at the scheduled time and on the administrative system, one or more approved managed nodes based on the stored pre-requisite query results, wherein the one or more approved managed nodes has attribute information matching the necessary configuration attributes for the package and the one or more dependent packages, and wherein the attribute information is obtained before the scheduled time; and
sending, at the scheduled time, the package and the one or more dependent packages to the one or more approved managed nodes.

2. The method of claim 1, further comprising receiving a request from a managed node for the package.

3. The method of claim 1, wherein the first pre-requisite query includes an operating system requirement and a software requirement.

4. The method of claim 3, wherein the first pre-requisite query further includes a disk space requirement and a RAM requirement.

5. The method of claim 1, further comprising storing the pre-requisite query and the attribute information in a database on the administrative system.

6. The method of claim 1, wherein the first pre-requisite query identifies attribute information that a managed node should not have for the package.

7. The method of claim 1, wherein the first pre-requisite query comprises one or more sub-queries joined together using logical combinations of AND or OR operations.

8. The method of claim 1, further comprising:
associating the first pre-requisite query with a second package; and
sending the second package to the one or more managed nodes that have the necessary attribute information for the second package.

9. The method of claim 1, further comprising not sending the package and the dependent package to the one or more managed nodes that do not have the necessary attribute information for the dependent package.

10. The method of claim 1, further comprising communicating, by a management application, with a new managed node.

11. The method of claim 1, wherein the attribute information comprises at least one of a dynamic link library requirement, a video requirement, a modem requirement, and an optical drive requirement.

12. The method of claim 1, wherein the pre-requisite queries are lightweight directory access protocol (LDAP) queries.

13. A computer system that is configured for distributing a computer software package using a pre-requisite query, the computer system comprising:
a processor;
memory in electronic communication with the processor;
instructions stored in the memory, the instructions being executable to:
associate a first pre-requisite query with a package, wherein the first pre-requisite query defines necessary configuration attributes that a node must possess to install the package;
associate a second pre-requisite query with each of one or more dependent packages, wherein a dependent package is required to be deployed with the package;
wherein said pre-requisite query contains attributes that a machine needs in order to have the package and dependent packages installed on the system;
obtain, by a management application, attribute information from one or more managed nodes across a computer network by communicating with a management agent on each of the one or more managed nodes;
store the attribute information on the computer system, wherein the computer system includes the management application;
scheduling the package to be deployed at a schedule time;
store schedule information on the computer system;
evaluating at the scheduled time the first pre-requisite query associated with the package and the second pre-requisite queries associated with each of the one or more dependent packages with the stored attribute information of the one or more managed nodes;
store, on the computer system, all pre-requisite query results for the one or more managed nodes for the first pre-requisite query and each pre-requisite query associated with the one or more dependent packages;
determine, at the scheduled time and on the computer system, one or more approved managed nodes based on the stored pre-requisite query results and the attribute information on the computer system, wherein the one or more approved managed nodes has attribute information matching the necessary configuration attributes for the package and the one or more dependent packages, and wherein the attribute information is obtained before the scheduled time; and
send, at the scheduled time, the package and the one or more dependent packages to the one or more approved managed nodes.

14. The system of claim 13, wherein the instructions are further executable to associate a plurality of pre-requisite queries with a plurality of packages.

15. The system of claim 14, further comprising a database stored in the memory.

16. The system of claim 15, wherein the database is configured to store the plurality of pre-requisite queries and the attribute information.

17. A computer-readable memory comprising executable instructions for distributing a computer software package using a pre-requisite query, the instructions being executable to:

associate a first pre-requisite query with a package, wherein the first pre-requisite query defines necessary configuration attributes that a node must possess to install the package;

associate a second pre-requisite query with each of one or more dependent packages, wherein a dependent package is required to be deployed with the package;

wherein said pre-requisite query contains attributes that a machine needs in order to have the package and dependent packages installed on the system;

obtain, by a management application, attribute information from one or more managed nodes across a computer network by communicating with a management agent on each of the one or more managed nodes;

store the attribute information on an administrative system, wherein the administrative system includes the management application;

scheduling the package to be deployed at a scheduled time;

store schedule information on the administrative system;

evaluate at the scheduled time the first pre-requisite query associated with the package and the second pre-requisite queries associated with each of the one or more dependent packages with the stored attribute information of the one or more managed nodes;

store, on the administrative system, all pre-requisite query results for the one or more managed nodes for the first pre-requisite query and each second pre-requisite query associated with the one or more dependent packages;

determine, at the scheduled time and on the administrative system, one or more approved managed nodes based on the stored pre-requisite query results, wherein the one or more approved managed nodes has attribute information matching the necessary configuration attributes for the package and the one or more dependent packages, and wherein the attribute information is obtained before the scheduled time; and send, at the scheduled time, the package and the one or more dependent packages to the one or more approved managed nodes.

* * * * *

UNITED STATES PATENT AND TRADEMARK OFFICE
CERTIFICATE OF CORRECTION

PATENT NO. : 8,719,815 B1
APPLICATION NO. : 11/298809
DATED : May 6, 2014
INVENTOR(S) : Richard Park et al.

It is certified that error appears in the above-identified patent and that said Letters Patent is hereby corrected as shown below:

In the Specification

In column 2, line 66 please delete "the managed mode may" and replace it with --the managed node may--.

Signed and Sealed this
Twenty-eighth Day of October, 2014

Michelle K. Lee
*Deputy Director of the United States Patent and Trademark Office*